(12) United States Patent
Linfoot et al.

(10) Patent No.: US 9,664,811 B2
(45) Date of Patent: May 30, 2017

(54) METHODS AND SYSTEMS FOR USING A COMBINED ELECTROMAGNETIC SOURCE ELECTRODE AND DEFLECTOR

(71) Applicant: PGS Geophysical AS, Lysaker (NO)

(72) Inventors: Johnathan P. Linfoot, Edinburgh (GB); Oliver Colin Peppe, West Linton (GB)

(73) Assignee: PGS Geophysical AS, Oslo (NO)

( * ) Notice: Subject to any disclaimer, the term of this patent is extended or adjusted under 35 U.S.C. 154(b) by 885 days.

(21) Appl. No.: 13/719,456

(22) Filed: Dec. 19, 2012

(65) Prior Publication Data

US 2014/0167768 A1 Jun. 19, 2014

(51) Int. Cl.
*G01V 3/15* (2006.01)
*G01V 3/12* (2006.01)

(52) U.S. Cl.
CPC . *G01V 3/15* (2013.01); *G01V 3/12* (2013.01)

(58) Field of Classification Search
CPC .................................. G01V 3/15; G01V 3/12
See application file for complete search history.

(56) References Cited

U.S. PATENT DOCUMENTS

| | | | |
|---|---|---|---|
| 3,434,446 A * | 3/1969 | Cole | B63B 21/66 114/245 |
| 4,298,840 A | 11/1981 | Bischoff et al. | |
| 4,617,518 A | 10/1986 | Srnka | |
| 5,546,882 A | 8/1996 | Kuche | |
| 5,913,280 A | 6/1999 | Nielsen et al. | |
| 6,234,102 B1 | 5/2001 | Russell et al. | |
| 6,267,070 B1 | 7/2001 | Russell et al. | |
| 6,681,710 B2 | 1/2004 | Semb | |
| 7,047,898 B2 | 5/2006 | Petersen et al. | |
| 7,142,481 B1 | 11/2006 | Metzbower et al. | |
| 7,221,619 B1 | 5/2007 | George | |
| 7,404,370 B2 | 7/2008 | Stokkeland | |
| 7,737,698 B2 * | 6/2010 | Tenghamn | G01V 3/12 324/347 |
| 7,834,632 B2 | 11/2010 | Tenghamn et al. | |
| 7,881,153 B2 | 2/2011 | Stokkeland et al. | |
| 8,098,542 B2 | 1/2012 | Hillesund et al. | |
| 8,183,868 B2 | 5/2012 | Summerfield et al. | |
| 8,267,031 B2 | 9/2012 | Austad et al. | |

(Continued)

FOREIGN PATENT DOCUMENTS

WO    WO 9825162 A1    6/1998

OTHER PUBLICATIONS

316/316L Stainless Steel, Product Data Sheet, AK Steel Corporation, 2007.

(Continued)

*Primary Examiner* — Patrick Assouad
*Assistant Examiner* — Haidong Zhang

(57) ABSTRACT

Disclosed are methods and systems for marine geophysical surveying that include a combined electromagnetic source electrode and deflector. An example embodiment discloses an electromagnetic source assembly comprising: a deflector-source electrode, wherein the deflector-source electrode comprises an electromagnetic source electrode integrated into a deflector; a separate electromagnetic source electrode; and a power source coupled to the electromagnetic source electrode and the separate electromagnetic source electrode.

17 Claims, 4 Drawing Sheets

(56) References Cited

U.S. PATENT DOCUMENTS

| | | | |
|---|---|---|---|
| 2008/0022913 A1* | 1/2008 | Toennessen | A01K 73/05 |
| | | | 114/245 |
| 2008/0304357 A1 | 12/2008 | Toennessen | |
| 2009/0262601 A1* | 10/2009 | Hillesund et al. | G01V 1/3826 |
| | | | 367/16 |
| 2010/0045296 A1 | 2/2010 | Tenghamn | |
| 2011/0103179 A1 | 5/2011 | Vageskar et al. | |
| 2011/0158045 A1 | 6/2011 | Karlsen et al. | |
| 2011/0255369 A1 | 10/2011 | Harrick et al. | |
| 2012/0116679 A1 | 5/2012 | Alumbaugh et al. | |
| 2012/0194196 A1* | 8/2012 | Combee et al. | G01V 3/083 |
| | | | 324/365 |
| 2012/0223718 A1* | 9/2012 | Peppe et al. | G01V 3/083 |
| | | | 324/365 |
| 2013/0093426 A1 | 4/2013 | Peppe et al. | |
| 2013/0162256 A1 | 6/2013 | Hobbs | |
| 2014/0140169 A1 | 5/2014 | Cambois | |

OTHER PUBLICATIONS

James Brady et al., "Electromagnetic Sounding for Hydrocarbons", Oilfield Review, Spring 2009, 21, No. 1, pp. 4-19.
Staff Report, "2014 Meritorious Awards for Engineering Innovation", www.epmag.com/item/print/2014-Meritorious-Awards-Engineering-Innovation-132699, Aug. 28, 2014, see p. 8, 12 pages total.

* cited by examiner

METHODS AND SYSTEMS FOR USING A COMBINED ELECTROMAGNETIC SOURCE ELECTRODE AND DEFLECTOR

BACKGROUND

Certain types of marine geophysical surveying, such as seismic or electromagnetic surveying, may include towing an energy source at a selected depth in a body of water. One or more geophysical sensor streamers may also be towed in the water at selected depths. The streamers may be long cables having geophysical sensors disposed thereon at spaced apart locations. Often, multiple streamers may be towed by a vessel, and the lateral separation between the streamers may be provided by the use of deflectors (also known as paravanes or doors). Deflectors have traditionally been large, sturdy, semi-buoyant equipment that can be reused from survey-to-survey for a number of years. Actuation of the energy source emits an energy field into the body of water. The energy field interacts with rock formations below the water bottom with changes in the energy field due to this interaction detected by geophysical sensors positioned on the sensor streamers, for instance. The detected energy may be used to infer certain properties of the subsurface rock, such as structure, mineral composition and fluid content, thereby providing information useful in the recovery of hydrocarbons. In addition to towed sensors, electromagnetic surveying may also use sensors that are substantially stationary in the body of water, which may include attachment of electromagnetic sensors on one or more cables positioned on the water bottom or attachment of the electromagnetic sensors to one or more subsurface acquisition nodes, for example.

In electromagnetic surveying, the energy source for inducing the energy fields (e.g., electromagnetic fields) include, among other devices, spaced apart electrodes or wire coils disposed along or at the end of a cable. The cable is typically towed by a vessel in the body of water. Time-varying current may be imparted across the electrodes to induce a time-varying field in the water and subsequently the subsurface rock formations. Source electrodes have traditionally been expected to deteriorate from the combination of use and exposure to sea water. In some instances, source electrodes are expected to be replaced as often as several times per year. Electromagnetic sensors may be used to measure one or more parameters (e.g., electric field components) related to a response of the subsurface rock formations to the induced electromagnetic field. Despite the data coverage that can be achieved, these types of towed systems may have drawbacks. For example, because the sensors typically only have electrodes spaced apart in the towing direction, only the inline component (e.g., inline electric field components) of the electromagnetic field may be measured. Because in-line data measurements can be less sensitive to resistor thickness at depth than cross-line data measurements depending on the depth of the water in which the survey is being conducted, use of the in-line component may result in a less well resolved image of the subsurface resistivity structure than could be obtained from the cross-line component or a combination of the two components. However, the inclusion of additional towed sources for emission of an electromagnetic field, which includes electric field components, in a cross-line direction to allow cross-line data measurements may add undesired expense and complexity to the towed system. Deploying any extra equipment typically will increase the risk and result in a more hazardous system to operate.

Accordingly, there is a need for improved methods and systems for marine electromagnetic surveys, for example, that can generate a cross-line electromagnetic field.

BRIEF DESCRIPTION OF THE DRAWINGS

These drawings illustrate certain aspects of some of the embodiments of the present invention and should not be used to limit or define the invention.

DETAILED DESCRIPTION

The present invention relates generally to marine geophysical surveying. More particularly, in one or more embodiments, the present invention relates to systems and methods for marine geophysical surveying that include a combined electromagnetic source electrode and deflector. The term "combined electromagnetic source electrode and deflector" is used herein interchangeably with the term "deflector-source electrode" and means an electromagnetic source electrode that has been integrated into a deflector.

In accordance with present embodiments, a geophysical survey system may include a survey vessel that tows a pair of deflector-source electrodes. The deflector-source electrodes may be laterally spaced apart from one another and used to provide the desired lateral spacing for other components of the survey system, such as a plurality of sensor streamers (e.g., electromagnetic, sensor streamer(s), seismic sensors streamers) that may also be towed from the survey vessel. The term "laterally," as used herein means generally transverse to the direction of motion of the survey vessel. The term "generally transverse" as used herein means an item is oriented at an angle of from about 80° to about 1000° with respect to another item. Because the deflector-source electrodes may be laterally spaced apart, activation of the deflector-source electrodes should generate a cross-line electromagnetic field. In other words, the deflector-source electrodes may be used to generate an electromagnetic field having a dipole moment that is generally transverse to the direction of motion of the survey vessel. Accordingly, cross-line data measurements (including measurements of the electric filed components of the electromagnetic field, for example) may be taken by corresponding electromagnetic receivers that can enable improved subsurface imaging either through sole use of the cross-line data or through combined cross-line/inline processing.

Figure 1:
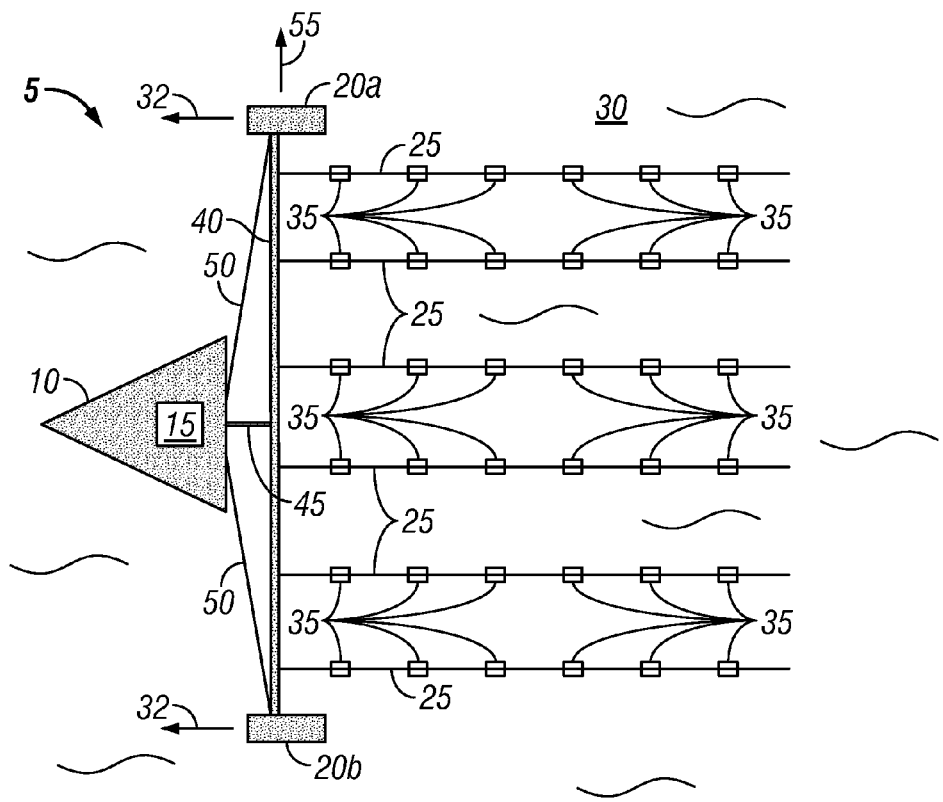
FIG. 1 illustrates an example embodiment of a geophysical survey system comprising a pair of deflector-source electrodes.
Figure 2:
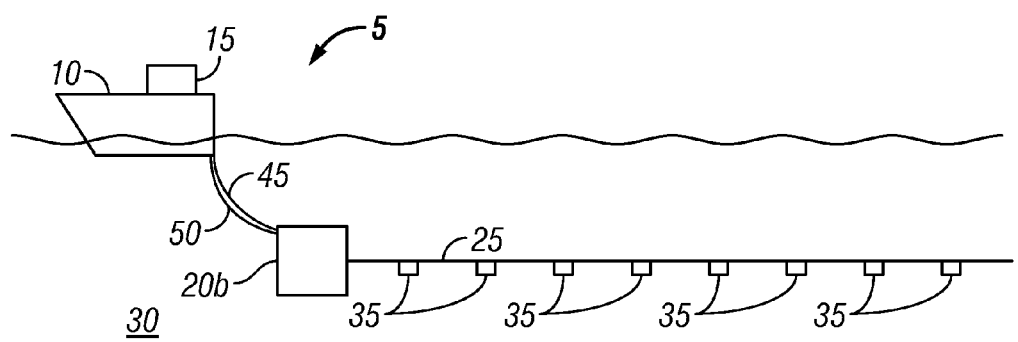
FIG. 2 is a side view of the geophysical survey system shown on FIG. 1.

Referring now to FIGS. 1 and 2, a marine geophysical survey system 5 is illustrated in accordance with example embodiments. As illustrated, the marine geophysical survey system 5 includes a survey vessel 10, a recording system 15, deflector-source electrodes 20, and sensor streamers 25. In the illustrated embodiment, the survey vessel 10 may move along the surface of a body of water 30, such as a lake or ocean, in the direction indicated by arrow 32. The survey vessel 10 may include thereon equipment, shown generally at 15 and collectively referred to herein as a "recording system." The recording system 15 may include devices (none shown separately) for determining geodetic position of the vessel (e.g., a global positioning system), detecting and making a time indexed record of signals generated by each of geophysical sensors 35 (explained further below), and actuating one or more of the deflector-source electrodes 20 or other energy sources.

In example embodiments, the survey vessel 10 tows a pair of deflector-source electrodes 20. As previously described, the deflector-source electrodes 20 each include a separate electromagnetic source electrode that has been integrated into a deflector. While not illustrated, the deflector-source electrodes 20 may each be coupled to a surface reference, such as a buoy or other suitable flotation device. In the illustrated embodiment, the deflector-source electrodes 20 are coupled to one or more spreader lines 40 that extend between the deflector-source electrodes 20. While not illustrated, a spur line or other suitable connector may couple each deflector-source electrode 20 to the spreader lines 40. The spreader lines 40 may be coupled to the survey vessel 10 by lead-in line 45. The spreader lines 40 and lead-in line 45 may be, for example, any of a variety of lines suitable for use in marine survey systems, including, without limitation, fiber robes, armored cables, or other similar devices. In some embodiments, the spreader lines 40 and/or the lead-in line 45 may transmit towing force from the survey vessel 10 to the deflector-source electrodes 20. In some embodiments, the spreader lines 40 and/or the lead-in line 45 may communicate power and/or signals between the recording system 15 and the deflector-source electrodes 20. In one particular embodiment, each of the deflector-source electrodes 20 may have a separate tension member 50 (e.g., a fiber rope, armored cable, etc.) coupling the corresponding one of the deflector-source electrodes 20 to the survey vessel 10 for transmitting towing force, power, and/or signals. Those of ordinary skill in the art, with the benefit of this disclosure, will appreciate that other suitable techniques may be used for towing the deflector-source electrodes and/or transmitting power and/or signals.

The deflector-source electrodes 20 may include a deflector that provides lateral thrust with respect to the direction of movement of the survey vessel 10 for maintaining a desired lateral spacing of the sensor streamers 25. For example, the deflector may be shaped to provide a lateral component of force as towed through the body of water 30. The lateral thrust should move each of the deflector-source electrodes 20 outward until the sensor streamers 25 are placed in selected lateral positions. In one example, separation is selected to place tension in the spreader lines 45. In some embodiments, a lateral spread of at least about 150 meters may be achieved between the deflector-source electrodes 20, at least about 500 meters in another embodiment, and at least about 1000 meters in another embodiment. In one particular embodiment, the lateral spread between the deflector-source electrodes 20 may be in a range of from about 250 to about 500 meters. The deflector may be any type of deflector known in the art, such as doors and steering rudders. One example of a suitable deflector includes a wing-shaped body used to generate lateral thrust. Another example of a suitable deflector includes one or more foils that generate lateral thrust as towed through the body of water 30. In some embodiments, the deflector-source electrodes 20 may be remotely controlled, for example, to control the angle of attack, which is the angle the deflector-source electrodes 20 take with respect to their respective direction 32 (shown on FIG. 1) of travel through the body of water 30.

The electrode portion of the deflector-source electrodes 20 may be made from any of a variety of suitable electrically conducting surfaces for use in geophysical surveys, including metal, carbon fiber, and graphite impregnated glass fiber or other fibers. Examples of suitable metals include stainless steel (e.g., Type 316 stainless steel) or copper. In some embodiments, the electrically conducting surfaces may comprise a metal coated with a mixed-metal oxide, such as titanium coated with a mixed-metal oxide or titanium-clad copper coated with a mixed metal oxide.

At selected times, the deflector-source electrodes 20 may be actuated to introduce electrical currents into the body of water 30. For example, certain of the equipment in the recording system 15 may pass electric current through the deflector-source electrodes 20 for actuation. When the deflector-source electrodes 20 are actuated, an electric dipole is produced in the direction represented by arrow 55, which is generally transverse to the direction 32 of motion of the survey vessel 10. In this manner, the pair of deflector-source electrodes 20 generates a cross-line electromagnetic field, which includes electric field components that propagate through the body of water 30 and into formation below the water bottom 28. In example embodiments, the particular type of current conducted across the deflector-source electrodes 20 may be single- or multi-frequency alternating current, or various forms of switched direct current, such that either or both transient and frequency domain controlled source electromagnetic surveying may be performed.

In example embodiments, the survey vessel 10 further tows a plurality of laterally spaced apart sensor streamers 25. While FIG. 1 illustrates six sensor streamers 25, it should be understood that this is for illustrative purposes only and more or less than six may be used in example embodiments. For example, up to as many as eight or more laterally spaced apart streamers 25 may be towed by the survey vessel 10, while in other embodiments up to twenty-six laterally spaced apart streamers 25 may be towed by the survey vessel 10. The sensor streamers 25 may be coupled to the survey vessel 10 by lead-in line 45 wherein spreader lines 40 may extend between the sensor streamers 25. The sensor streamers 25 may be formed, for example, by coupling a plurality of streamer segments end-to-end as explained in U.S. Pat. No. 7,142,481, the disclosure of which is incorporated herein by reference. As illustrated, the geophysical sensors 35 may be disposed on the sensor streamers 25 at longitudinally spaced apart locations. The geophysical sensors 35 may be, without limitation, seismic sensors such as geophones, hydrophones, or accelerometers, or electromagnetic field sensors, such as electrodes or magnetometers. Combinations of seismic and electromagnetic field sensors may also be used. In one embodiment, at least one of the sensor streamers 25 includes a plurality of electromagnetic field sensors at longitudinally spaced apart locations. In one embodiment, each of the sensors streamers 25 includes a plurality of electromagnetic field sensors. In alternative embodiments, electromagnetic field sensors may be used that are substantially stationary in the body of water 30. The fixed electromagnetic field sensors may be in addition to the sensor streamers 25. The fixed electromagnetic field sensors may be positioned on one or more cables positioned on the water bottom 28 or attached to one or more subsurface acquisition nodes, for example. These electromagnetic field sensors may be considered substantially stationary as they are not being towed in the body of water 30, but could be subjected to some limited movement, for example, as they may be floating.

The electromagnetic field sensors may measure one or more electromagnetic field properties, such as voltage, magnetic field amplitude, and/or magnetic field gradient, for example, after interaction of the field with rock formations 26 below the water bottom 28. In one embodiment, at least one of the sensor streamers 25 includes a plurality of electromagnetic field sensors at longitudinally spaced apart locations while at least one of the sensor streamers 25 may include a plurality of seismic sensors. The seismic sensors may sense energy emitted from one or more seismic sources (not shown) after it has interacted with rock formations 26 below the water bottom 28. The seismic sources may be towed by the survey vessel 10 or a different vessel. In some embodiments, the same one of the sensor streamers may comprise electromagnetic field sensors and seismic sensors. While not illustrated, additional equipment may be positioned on the sensor streamers 25 including, without limitation, lateral force and depth control devices, such as "birds" having variable incidence wings, and depth sensors.

The sensor streamers 25 may be towed at a variety of different depths as may be applicable for different applications. For example, the sensor streamers 25 may be towed at a depth of up to about 25 meters. In additional embodiments, the sensor streamers 25 may be towed at a depth of at least about 25 meters and up to about 500 meters or deeper. In some embodiments, at least one of the sensor streamers 25, such as a seismic sensor streamer, may be held at or near the surface (e.g., less than about 25 meters) while one or more of the streamers, such as an electromagnetic sensor streamer, may be positioned deeper in the body of water (e.g., about 25 to about 500 meters or deeper).

Figure 3:
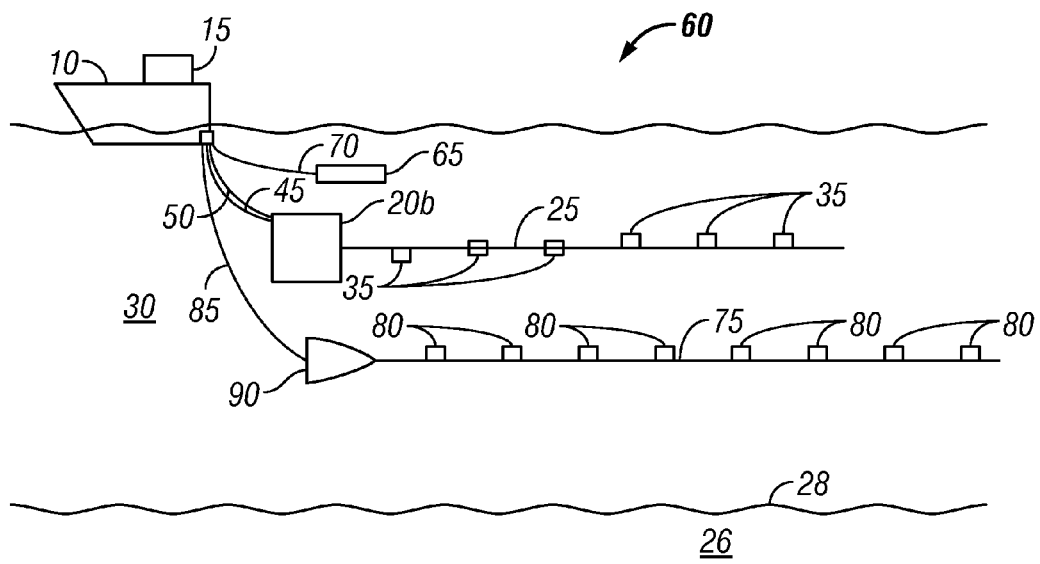
FIG. 3 illustrates an example embodiment of a combined seismic/electromagnetic survey system comprising a pair of deflector-source electrodes.

FIG. 3 illustrates a combined seismic/electromagnetic survey system 60 in accordance with example embodiments. As illustrated, the survey vessel 10 may move along the surface of the body of water 30, wherein the survey vessel 10 includes to recording system 15. The survey vessel 10 may further tow a seismic source 65 and a plurality of sensor streamers 25, only one of which is shown on FIG. 3. The seismic source 65 may be coupled to the survey vessel 10 by a corresponding source lead-in line 70. The sensor streamers 25 may comprise a plurality of longitudinally spaced geophysical sensors 35, which may be, without limitation, seismic sensors such as geophones, hydrophones, or accelerometers, or electromagnetic field sensors, such as electrodes or magnetometers, or a combination of seismic and electromagnetic field sensors. One or more spreader lines (not shown) may extend between the sensor streamers 25 with a lead-line 45 coupling the sensor streamers 25 to the survey vessel 10. In the illustrated embodiment, a pair of deflector-source electrodes 20 is coupled to the spreader lines and provides a lateral thrust for maintaining a desired lateral spacing of the sensor streamers 25. In some embodiments, a tension member 50 may couple the deflector-source electrodes 20 to the survey vessel 10. In addition, to the sensor streamers 25, the survey vessel 10 may further tow at least one electromagnetic sensor streamer 75, which may be at a different and deeper depth than the sensor streamers 25, for example. While only a single electromagnetic sensor streamer 75 is illustrated, it is contemplated that embodiments may use more than one electromagnetic sensor streamer 75 in conjunction with the sensor streamers 25. The electromagnetic sensor streamer 75 may include a plurality of longitudinally spaced electromagnetic sensors 80. A lead-in line 85 may couple the electromagnetic sensor streamer 75 to the survey vessel 10. In the illustrated embodiment, a hydrodynamic depressor 90 is disposed at a forward end (with respect to direction of movement of the survey vessel 10) of the electromagnetic sensor streamer 75.

Figure 4:
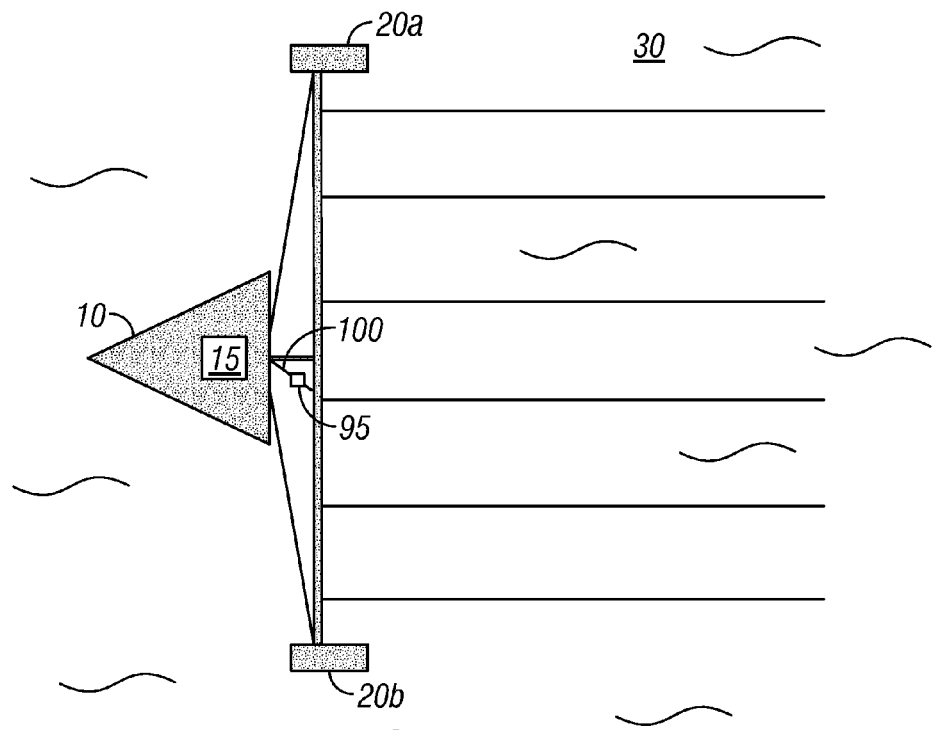
FIG. 4 illustrates an example embodiment of a geophysical survey system comprising a pair of deflector-source electrodes and a third electrode towed between the deflector-source electrodes.

FIG. 4 illustrates the electromagnetic survey system 5 of FIG. 1 further comprising at third electromagnetic source electrode 95. As illustrated, the survey vessel 10 may tow the third electromagnetic source electrode 95 through the body of water 30. A source lead-in line 100 may couple the third electromagnetic source electrode 95 to the survey vessel 10. In some embodiments, certain equipment of the recording system 15 (e.g., power source 110 shown on FIG. 6) may actuate the third electromagnetic source electrode 95 in combination with one or both of the deflector-source electrodes 20a, 20b. In one particular embodiment, a first deflector-source electrode 20a is active and paired with the third electromagnetic source electrode 95 while the other deflector-source electrode 20b is either inactive or is simply a deflector without an integrated electrode such that the system 5 may include only a single deflector-source electrode 20a. In one embodiment, the third electromagnetic source electrode 95 may form the near electrode of an inline source.

Figure 5:
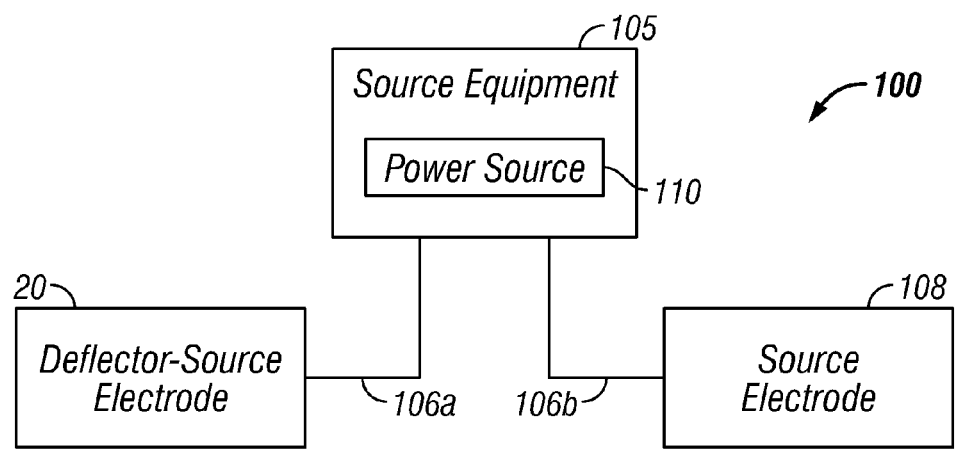
FIG. 5 illustrates an example embodiment of an electromagnetic source assembly.

FIG. 5 illustrates an example embodiment of a source assembly 100 that comprises a deflector-source electrode 20. As illustrated, the source assembly 100 may comprise a deflector-source electrode 20 coupled to the source equipment 105. As further illustrated, the source assembly 100 may further comprise a source electrode 108 also coupled to the source equipment 105. In some embodiments, the source electrode 108 may be integrated into a deflector or, alternatively, may be a separate source electrode, such as third source electromagnetic electrode shown on FIG. 4. One or more lines 106a, 106b may couple the source assembly 100 to the deflector-source electrode 20 and the source electrode 108. In particular embodiments, the lines 106a, 106b may provide power and/or control or other signals to the deflector-source electrode 20 and the source electrode 108. In some embodiments, the source assembly 100 may include source equipment 105, which may be positioned on the survey vessel 10 as a component of the recording system 15 shown on FIGS. 1-4. In alternative embodiments (not shown), one or more components of the source equipment 105 may be towed. The source equipment 105 may include a power source 110 for providing power to the deflector-source electrodes 20. While not illustrated, the source equipment 105 may also include additional devices, such as power supplies, transformers, controllers, power converters, H-bridge switches, communications equipment, etc. At selected times, the source equipment 105 may pass electric current through the deflector-source electrode 20 and/or the source electrode 108 for actuation.

As previously described, the deflector-source electrodes 20 each include an electromagnetic source electrode integrated into a deflector. Any number of different suitable techniques available to those in the art may be used for integration of the electromagnetic source electrode into the deflector. In example embodiments, the exterior surface of the deflector-source electrodes 20 may be the electrode. For example, the exterior surface may be constructed from a suitable electrically conductive material, such as those previously described. In one example, the exterior surface of the deflector-source electrodes 20 may comprise stainless steel (e.g., Type 316 stainless steel). The exterior surface of the deflector-source electrodes 20 may then be coupled to the source equipment 105 via the one or more lines (e.g., lines 106a, 106b shown on FIG. 5), which may provide power to the deflector-source electrodes 20, for example. At selected times, the source equipment 105 may pass electric current through the exterior surface for actuation and release of electric current into the body of water 30. Other suitable techniques for integration of the electromagnetic source electrode into the deflector are described below with respect to FIGS. 6-8.

Figure 6:
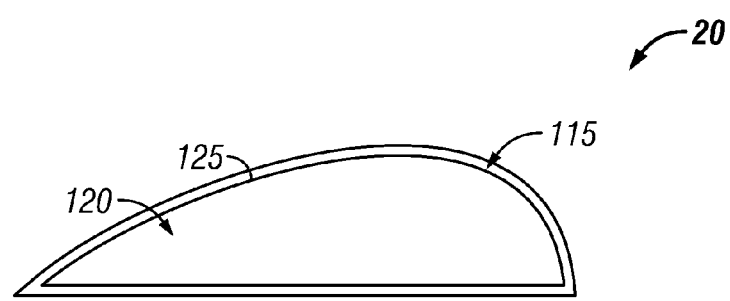
FIG. 6 illustrates an example embodiment of a deflector-source electrode.

FIG. 6 illustrates an example embodiment of a deflector-source electrode 20 in more detail. As illustrated, the deflector-source electrode 20 comprises an electromagnetic source electrode 115 integrated into a deflector 120. In the illustrated embodiment, the deflector 120 is a generally wing-shaped device; however, it should be understood that other suitable configurations suitable for use in marine surveying may be used for the deflector 120. The deflector 120 has an exterior surface 125. As previously described, embodiments may include using the exterior surface 125 as the electrode to emit electric current into the body of water 30. Alternatively, as illustrated by FIG. 6, embodiments may include the source electrode 115 in the form a skin or other covering that at least partially wraps or coats the exterior surface 125 of the deflector 120. It is not necessary for the source electrode 115 to completely wrap or coat the exterior surface 125 so long as sufficient surface area of the source electrode 115 is exposed to the body of water 30 for generation of the desired electric current. In some embodiments, electrode 115 may form a mesh or a series of striping on exterior surface 125.

Figure 7:
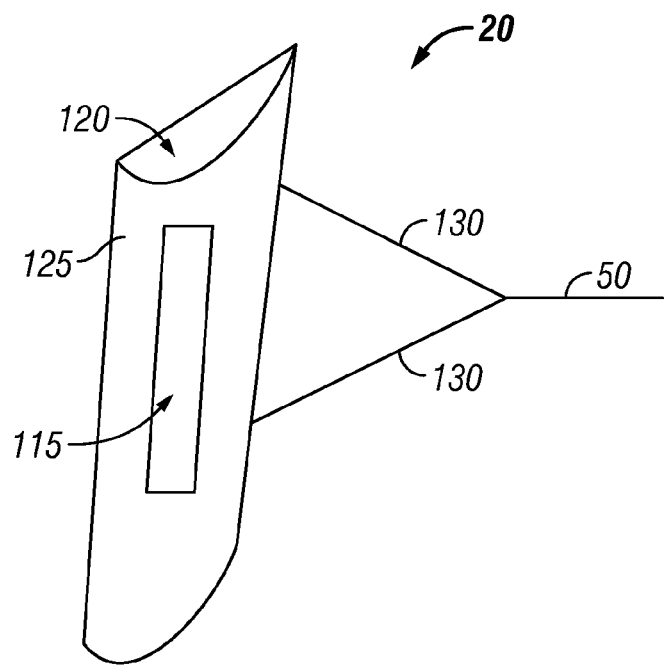
FIG. 7 illustrates another example embodiment of a deflector-source electrode.

FIG. 7 illustrates another example embodiment of a deflector-source electrode 20 in which a source electrode 115 is integrated into a deflector 120. In this example, the source electrode 115 is attached to the deflector 120. As illustrated, the source electrode 115 may be directly attached to an outer surface 125 of the deflector 120. In some embodiments, this connection may be a rigid connection, such that the source electrode 115 cannot move independently of the deflector 120. Any of a variety of different techniques may be used for attachment of the deflector 120 to the outer surface 125 including without limitation adhesives and fasteners. As illustrated, the deflector-source electrode 20 may be coupled to a tension member 50. In the illustrated embodiment, one or more bridal lines 130 are used to interconnect the tension member 50 and the deflector-source electrode 20.

Figure 8:
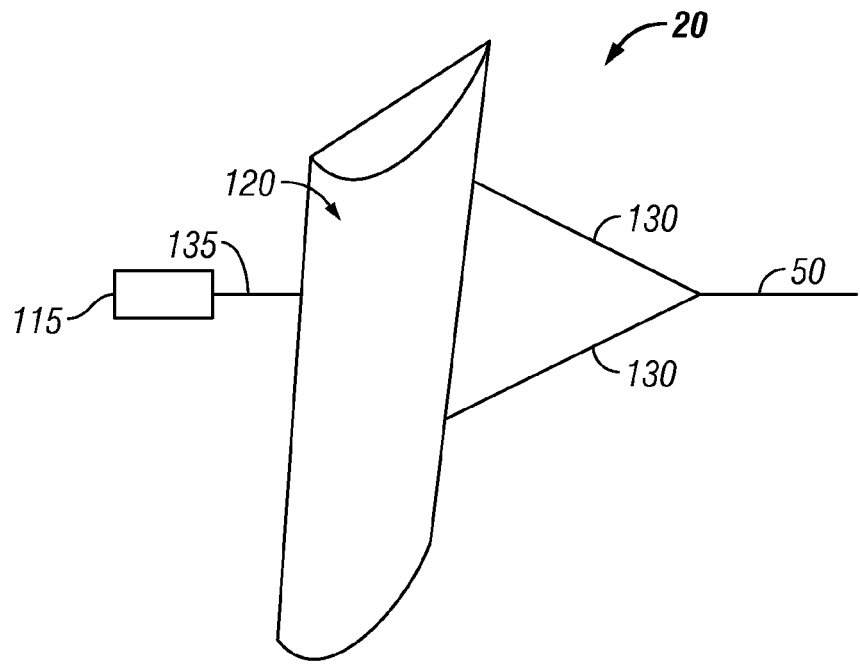
FIG. 8 illustrates another example embodiment of a deflector-source electrode.

FIG. 8 illustrates another example embodiment of a deflector-source electrode 20 in which a source electrode 115 is integrated into a deflector 120. In the illustrated embodiment, the source electrode 115 is towed from the deflector 120. One or more tow lines 135 are shown coupling the source electrode 115 to the deflector 120; however, those of ordinary skill should recognize other suitable towing arrangements that may be used for towing the source electrode 115, including a bridal assembly, for example. In some embodiments, the tow lines 135 may transfer electric power to the source electrode 115 as well as providing a mechanical towing link. In alternative embodiments (not shown), a separate line may be used to transfer electric power to the source electrode 115. As illustrated, the deflector-source electrode 20 may be coupled to a tension member 50. In the illustrated embodiment, one or more bridle lines 130 are used to interconnect the tension member 50 and the deflector-source electrode 20.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range are specifically disclosed. Moreover, the indefinite articles "a" or "an," as used in the claims, are defined herein to mean one or more than one of the element that it introduces. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted for the purposes of understanding this invention.

What is claimed:

1. An electromagnetic source assembly comprising:
a door deflector;
an electromagnetic source electrode, wherein the electromagnetic source electrode comprises an electromagnetic source electrode integrated into the door deflector, wherein an exterior surface of the door deflector is the electromagnetic source electrode, the exterior surface being an electrically conductive material;
a separate electromagnetic source electrode; and
a power source coupled to the electromagnetic source electrode and the separate electromagnetic source electrode, wherein the power source energizes the electromagnetic source electrode.

2. The electromagnetic source assembly of claim 1, wherein the electromagnetic source electrode comprises a covering at least partially covering an exterior surface of the deflector.

3. The electromagnetic source assembly of claim 1, wherein the electromagnetic source electrode is rigidly coupled to the deflector.

4. The electromagnetic source assembly of claim 1, wherein the separate electromagnetic source electrode is integrated into another deflector.

5. The electromagnetic source assembly of claim 1, wherein at least one component of the power source is on a tow vessel.

6. A method for marine geophysical surveying, comprising:
towing a plurality of laterally spaced apart geophysical sensor streamers through a body of water;
maintaining lateral separation between the geophysical sensor streamers using at least a pair of door deflectors, wherein an exterior surface of one of the door deflectors is an electromagnetic source electrode, the exterior surface being an electrically conductive material;

emitting an electromagnetic field into the body of water, wherein the emitting comprises actuating the electromagnetic source electrode by electrifying, the exterior surface; and measuring one or more properties of the electromagnetic field.

7. The method of claim 6, wherein the emitting the electromagnetic field further comprises actuating a separate electromagnetic source electrode.

8. The method of claim 7, wherein the other one of the door deflectors has the separate electromagnetic source electrode integrated therein, such that the electromagnetic field has a dipole moment that is transverse to a direction of motion of a survey vessel towing the geophysical sensor streamers.

9. The method of claim 6, wherein the one or more properties of the electromagnetic field are measured with electromagnetic field sensors on the geophysical sensor streamers or with electromagnetic field sensors that are substantially stationary in the body of water.

10. A marine geophysical survey system, comprising:
a vessel;
a plurality of laterally spaced apart geophysical sensor streamers coupled to the vessel;
a pair of door deflectors configured to maintain lateral separation of the geophysical sensor streamers, the deflectors being coupled to the survey vessel;
an electromagnetic source electrode, wherein the electromagnetic source electrode is an exterior surface of one of the door deflectors, the exterior surface being electrically conductive; and
a power source coupled to the electromagnetic source electrode wherein the power source is coupled to the exterior surface, wherein the power source electrifies the exterior surface.

11. The marine geophysical survey system of claim 10, wherein at least one of the geophysical sensor streamers comprises a plurality of longitudinally spaced seismic sensors.

12. The marine geophysical survey system of claim 10, wherein at least one of the geophysical sensor streamers comprises a plurality of longitudinally spaced electromagnetic field sensors.

13. The marine geophysical survey system of claim 10, wherein the electromagnetic source electrode comprises a covering at least partially covering an exterior surface of the one of the deflectors.

14. The marine geophysical survey system of claim 10, wherein the electromagnetic source electrode is rigidly coupled to the one of the door deflectors.

15. The marine geophysical survey system of claim 10, further comprising a second electromagnetic source electrode, wherein the other one of the door deflectors has the second electromagnetic source electrode integrated therein.

16. The marine geophysical survey system of claim 10, further comprising an electromagnetic sensor streamer configured for towing at a greater depth than the geophysical streamers.

17. The marine geophysical survey system of claim 10, wherein at least one component of the power source is on the vessel.

* * * * *